United States Patent Office 2,881,212
Patented Apr. 7, 1959

2,881,212

PROCESS AND CATALYST FOR THE PRODUCTION OF UNSATURATED CARBOXYLIC ACIDS

James D. Idol, Jr., Shaker Heights, James L. Callahan, Bedford, and Robert W. Foreman, Cleveland, Ohio, assignors to The Standard Oil Company, Cleveland, Ohio, a corporation of Ohio No Drawing. Application March 18, 1957
Serial No. 646,581

12 Claims. (Cl. 260—530)

This invention relates to the oxidation of unsaturated aldehydes. It deals with a new method of carrying out such an oxidation selectively to produce the corresponding unsaturated carboxylic acid in high yields. Another aspect of the invention deals with improved catalysts for the conversion of unsaturated aldehydes to the unsaturated corresponding acids. The invention has particular advantage in the production of acrylic and methacrylic acids.

The oxidation of saturated aldehydes to the corresponding saturated carboxylic acids is a well-known reaction which is carried out commercially on a large scale, especially for the production of acetic acid. Unsaturated aldehydes, however, have a marked tendency to undergo side reactions during oxidation, and consequently only poor yields of desirable acids are obtained under the usual conditions of reaction.

Some unsaturated acid can be obtained by oxidizing unsaturated aldehydes with hydrogen peroxide according to U. S. Patent 2,377,584 but large amounts of dihydroxy aldehyde are simultaneously produced in the patented process.

U.S. Patents 2,744,928 and 2,744,929 disclose methods by which unsaturated aldehydes may be converted to the corresponding unsaturated carboxylic acid. These methods involve a liquid phase reaction in the presence of a solvent and they require the use of both a catalyst and a peroxidizing agent such as hydrogen peroxide. This process has the disadvantage of involving solvent recovery steps and the use of hydrogen peroxide as a source of oxygen is not as economic as other oxygen sources.

It is the object of the present invention to overcome the disadvantages of prior methods of producing unsaturated carboxylic acids from unsaturated aldehydes by providing an efficient, commercially attractive method for converting unsaturated aldehydes to the corresponding carboxylic acids by direct vapor phase reaction of the aldehyde with oxygen in the presence of a catalyst. It has been found that unsaturated aldehydes can be selectively oxidized at the aldehyde group to produce high yields of unsaturated carboxylic acid by carrying out a catalytic vapor phase reaction employing oxygen as the oxidizing agent. It was most unexpected to fined that an unsaturated aldehyde could be successfully oxidized to the corresponding unsaturated acid in the vapor phase in view of the known highly reactive nature of the double bond in unsaturated aldehydes both with reference to oxidation and polymerization. Workers in the prior art apparently believed that the reaction had to be carried out in the liquid phase and that if the reaction were conducted at the elevated temperatures necessary to a vapor phase reaction that useless side reactions of the unsaturated aldehydes would predominate over the desired reaction. However, we have discovered a process which surprisingly produces good yields of the unsaturated acids. It was even more surprising that the undesirable side reactions which were thought to be characteristic of the unsaturated aldehydes do not occur to any appreciable extent in the process of our invention.

The unsaturated acids produced according to the process of this invention have wide utility in the plastics industry, either in their free form or as related compounds such as the esters. The ethyl and methyl esters of acrylic and methacrylic acids, for example, are in great demand at the present time.

In brief, the process of this invention is carried out by reacting an unsaturated aldehyde with oxygen in the vapor phase in the presence of a catalyst. The catalyst employed in this process is a phosphomolybdic acid or salt thereof which may be employed with or without a support. Another feature of the process relates to the addition of water in the vapor phase to the reaction zone, but the process is not limited to one in which water is necessarily present in the reaction zone as the desired reaction will occur in the absence of water with some reduction in yield.

The process of this invention is applicable to the oxidation of a wide variety of unsaturated aldehydes which may be aliphatic, alicyclic or aromatic substituted aldehydes. The aldehydes may be substituted by hydroxy, ether, carboxylic acid, carboxylic acid ester, keto, nitro and like groups or halogen atoms. Acrolein, alpha-chloracrolein, crotonaldehyde, methacrolein, alpha-ethylacrolein, beta-methyl crotonaldehyde, alpha, beta-dimethyl crotonaldehyde, alpha, gamma-dimethyl crotonaldehyde, beta-ethyl crotonaldehyde, 2-hexenal, alpha-isobutylacrolein, alpha-amylacrolein, alpha- or beta-cyclohexylacrolein, beta-phenethylacrolein, tetrolaldehyde, cinnamaldehyde, propargylic aldehyde and the like are representative of the alpha, beta-unsaturated aldehydes to which the new process can be applied with special advantage because this type of unsaturated aldehyde gives particularly great difficulty in oxidation to unsaturated acids by prior methods.

The new process is equally successful, however, in producing unsaturated carboxylic acids from aldehydes having the double bond further removed from the aldehyde group. Typical examples of such aldehydes which have been so used are vinyl acetaldehyde, 3- or 4-pentenal, methyl vinyl acetaldehyde, isopropenyl acetaldehyde, and 2-phenyl-4-hexenal.

Mixtures of two or more such aldehydes can be oxidized to unsaturated acids in the same way as individual unsaturated aldehydes. The unsaturated aldehyde or unsaturated aldehyde mixture can contain other compounds including saturated aldehydes which may undergo simultaneous oxidation or inert compounds which will not interfere with the reaction.

The catalyst which is employed in the process of this invention is a phosphomolybdic acid or a salt thereof. In the preferred embodiment of the process, the free acid is employed and it has the following formula:

$$H_3PMo_xO_y$$

where:

$x$ may be 5 to 20
$y$ may be 19 to 64

Free acids may be prepared in any of several ways: (1) by mixing appropriate quantities of phosphoric and molybdic acid; (2) by double decomposition of salts; (3) by extraction with ether from acidified aqueous solutions; (4) by ion exchange from phosphomolybdate salts. When a salt is to be employed, the appropriate phosphomolybdate salt may be made in solution generally after acidifying and heating theoretical quantities of the reactants. Any metallic cation can be used to form the salt, but the bismuth, tin, and antimony salts of phosphomolybdic acid have been found to be preferable. In some instances, it may be beneficial to have an excess of the metallic cation present when a salt is to be employed as the catalyst.

Although the phosphomolybdic acid or salt thereof may be employed in an unsupported form, it may also be employed in conjunction with a support. If a support is employed, the final catalyst should comprise at least 10 weight percent of the phosphomolybdic compound and particularly good results are obtained when the final catalyst comprises at least about 50 weight percent of the phosphomolybdic compound. Catalysts comprising 10 percent or less of the phosphomolybdic compound are operable but the conversion level is reduced. The preferred support is silica but it is not required that the silica be pure and it may contain varying amounts of alumina. Other inert supports such as titania, zirconium oxide and the like may be conveniently employed.

It is preferred that the surface area of the catalyst not be too great. It has been observed that a catalyst having a high surface area has a high activity which impairs the selectivity of the catalyst and it may result in the oxidation of the unsaturated aldehyde beyond the desired degree. The surface area as measured by conventional methods should be in the range of 1 to 250 square meters per gram and it is preferred that the surface area of the catalyst be in the range of about 25 to about 100 square meters per gram.

The phosphomolybdic acid or salt thereof may be incorporated on the support by means of either impregnation or co-gelation; however, it is preferred to prepare the catalyst by co-gelling the phosphomolybdic acid or salt thereof with the support. The latter method yields a catalyst which has superior activity for the desired reaction and which has a greater degree of homogeneity than the impregnated catalyst. Whatever the method of preparation, it may be beneficial to subject the catalyst to heat treatment after preparation. It has been observed that there is little advantage to employing temperatures of over 1000° F. for such heat treatment.

Oxygen for the process of this invention may be supplied either in the form of air or as free molecular oxygen and the reaction will proceed to some extent in the absence of added oxygen since the catalyst employed in the process will furnish some oxygen to the reaction, but in the preferred mode of executing the process of this invention additional oxygen is supplied to the reactor. Air is the preferred source of oxygen since the nitrogen contained therein serves as a purge gas in the reactor. The amount of oxygen fed to the reactor based on 1 mol of unsaturated aldehyde should be in the range of 0.5 to 50 mols, but the best results are obtained when the molal ratio of oxygen to unsaturated aldehyde is about 1:1. As mentioned heretofore, water has a beneficial effect on the course of the reaction and relatively large quantities of water may be fed to the reactor along with the unsaturated aldehyde. The molal ratio of water to the unsaturated aldehyde may be in the range of 0:1 to 12:1, but a ratio of about 7:1 is preferred.

The temperature at which the reaction is to be conducted has an effect on conversion; and while temperatures in the range of 500 to 900° F. may be employed, the best results are obtained when the temperature is in the range of about 650 to 750° F. A temperature of about 700° F. appears to be optimum for the conversion of acrolein to acrylic acid. Generally, the reaction is carried out at about atmospheric pressure but other pressures are operable.

Another important process variable is the apparent contact time which is defined here below:

Apparent contact time
$$= \frac{\text{Apparent volume of the catalyst in the reactor}}{\text{Volume of material fed to the reactor per unit time}}$$

The volume of material fed to the reaction is measured at the conditions of the reaction. In connection with the present process, it is customary to describe the contact time in terms of seconds. Broadly stated, contact times of 1 to 150 seconds have been found to be operable but the preferred range is 5 to 25 seconds.

The process of this invention may be conducted intermittently or continuously. A fixed-bed reactor employing a pelleted form of a catalyst may be employed, and it is also feasible to conduct the process in a reactor containing a fluidized catalyst bed. Since the reaction is exothermic, the temperature within the reactor must be regulated in order to control the reaction. It appears that the operation of a fluidized bed reactor offers some advantage from the standpoint of temperature regulation within the reactor.

The catalyst employed in this process is not materially affected by the reaction, and since it is not usually necessary to regenerate the catalyst no provision is ordinarily made for regeneration. However, catalyst regeneration is contemplated within the scope of this invention as certain operations may require such a step.

The products of this reaction may include carbon monoxide, carbon dioxide, and the unsaturated acid together with any unconverted unsaturated aldehyde. The desired product of the reaction; namely the unsaturated acid, may be recovered from the reactor effluent gases by conventional methods such as condensation, scrubbing with water or other suitable solvent, or compression followed by a subsequent expansion. If water scrubbing is employed in the case of the low molecular weight acids, it is advantageous to employ a hot scrubbing solution since the unreacted aldehydes and other light gases will generally boil at lower temperatures than the acids and they may be purified and recycled directly to the reactor. If there are any difficulties due to polymerization of the unsaturated acid when the product is recovered by water scrubbing, such difficulties may be overcome by adding a small amount of any of the known polymerization inhibitors to the scrubbing solution; as for example, hydroquinone. Other additives may also be conveniently employed, but inhibitors containing an amine should be avoided as they tend to accelerate polymerization.

In order to more fully illustrate the process of this invention, a number of illustrative examples of the process are given below: In the examples the following definitions are employed:

Conversion
$$= \frac{\text{Weight of unsaturated aldehyde in the feed} - \text{Weight of unsaturated aldehyde in the effluent}}{\text{Weight of unsaturated aldehyde in the feed}}$$

Yield
$$= \frac{\text{Weight of unsaturated aldehyde converted to acid}}{\text{Weight of unsaturated aldehyde in the feed} - \text{Weight of unsaturated aldehyde in the effluent}}$$

In the case where acrolein is the unsaturated aldehyde to be oxidized, the amount of acrolein is determined by treating an aliquot of a solution with excess dinitrophenyl hydrazine or by vapor phase chromotography. Acrylic acid which is the product of the acrolein reaction was determined by titrating an aliquot of an aqueous solution with sodium hydroxide. The titrated solution was evaporated to dryness and the salt recovered therefrom was analyzed by infrared for the acrylate. In all of the examples given below the products of the reaction were recovered by scrubbing the effluent gases from the reactor with cold water. The resulting solution is referred to in connection with the analyses mentioned above.

*Example I*

45 parts by weight of 40–100 mesh silica gel was calcined at 1800° F. for 18 hours in order to reduce its surface area. The calcined silica gel was then impregnated with a solution of 5 parts by weight of reagent grade phosphomolybdic acid ($P_2O_5 \cdot 20MoO_3 \cdot 48H_2O$) in about 15 parts by weight of water. The resulting catalyst was dried in an oven at 210° F. and subsequently heat treated in a muffle furnace at 1000° F. for 2 hours.

500 g. of the above-identified phosphomolybdic acid catalyst were placed in a cylindrical stainless steel reactor which had a volume of 1000 cc. The reactor was immersed in an electrically heated molten metal bath so that a temperature of 700° F. was maintained therein. A feed stream in the vapor form having the following composition was introduced into the heated reactor at atmospheric pressure:

| Component: | Parts by volume |
| --- | --- |
| Acrolein | 20 |
| Water | 60 |
| Air | 100 |

The contact time within the reactor was 15 seconds and the run lasted for 2700 seconds. The products of the reaction were recovered by water scrubbing and analyzed. It was determined that the conversion during this run was 22.5 percent and that the yield of acrylic acid was 85 percent.

Example II

A tin phosphomolybdate catalyst was prepared according to the following procedure:

95 g. of stannous chloride dihydrate was dissolved in 200 cc. of water and the pH of this solution was adjusted to 7 with concentrated ammonium hydroxide. The resulting precipitate was filtered and washed. In another vessel 5.8 cc. of 85 percent phosphoric acid was added to 1330 g. of a low alkali aqueous sol of colloidal silica containing 30 weight percent silica. Next a solution of 170 g. of molybdic acid in 150 cc. of water was added to the silica solution. The washed precipitate was slurried in 100 cc. of water and added to the silica mixture. The resulting gel was partially dried and the drying was completed by heating the gel in air at 1000° F. for a period of 2 hours. The dried catalyst was ground and screened to 60-200 mesh.

500 g. of this catalyst were inserted in the reactor described in Example I and a feed composed of 20 parts (by volume) of acrolein, 120 parts of water and 100 parts of air was passed over the catalyst at atmospheric pressure and a temperature of 700° F. The contact time was 12 seconds and the run was continued for 3000 seconds. The products of the reaction were recovered by water scrubbing and analyzed. The analysis revealed a conversion of 60 percent and a yield of acrylic acid of 60 percent.

Example III

A bismuth phosphomolybdate catalyst was prepared according to the following procedure:

A colloidal silica sol containing phosphoric and molybdic acid was prepared according to the procedure outlined in Example II with the addition of 10 cc. of concentrated nitric acid. 80 g. of $Bi(NO_3)_3 \cdot 5H_2O$ were dissolved in a dilute nitric acid solution and this was added to the silica sol. The resulting gel was partially dried and the drying was completed by placing the catalyst in a furnace at a temperature of 1000° F. for a period of 2 hours. The catalyst was then ground and screened to 60-200 mesh.

500 g. of this catalyst were placed in the reactor of Example I and a feed corresponding to that of Example I was passed over the catalyst at atmospheric pressure and a temperature of 690 F. The contact time was 15 seconds and the total run time was 2700 seconds. Products of the reaction were recovered by water scrubbing. Analysis of the product revealed a conversion of 18.4 percent with a yield of acrylic acid of 46.8 percent.

Example IV

Another phosphomolybdic acid catalyst was prepared according to the following procedure:

9.8 g. of 85 percent phosphoric acid was dissolved in 1500 milliliters of distilled water. 144 g. of molybdenum trioxide was slurried into the phosphoric acid solution. The slurry was heated without boiling for 3 hours and then filtered. The filtrate was evaporated to a volume of 200 milliliters and mixed with 510 g. of a low alkali aqueous silica sol containing 30 percent by weight silica. The resulting mixture was evaporated to dryness and then heated in the presence of air in a muffle furnace for 12 hours at 1000° F. The catalyst was ground and screened to 40-100 mesh.

500 g. of this catalyst were placed in the reactor of Example I. The gaseous stream was then fed to the reactor at atmospheric pressure and a temperature of 700° F. The feed had the following composition:

| Component: | Volume percent |
| --- | --- |
| Acrolein | 10.4 |
| Air | 47.9 |
| Water | 41.7 |

The contact time was 23.5 seconds and the run was continued for 2400 seconds. The products of the reaction were recovered by scrubbing the reactor effluent with water. Analysis of the products of this reaction revealed that 64.8 percent of acrolein in the feed had been converted to other products and the yield of acrylic acid was 35.1 percent.

Example IV-A

In another run with the catalyst of Example IV another feed stream was reacted under the conditions of Example IV. This feed had the following composition:

| Component: | Parts by volume |
| --- | --- |
| Methacrolein | 10 |
| Air | 50 |
| $H_2O$ | 30 |

The apparent contact time was 15 seconds and the run was continued for 1800 seconds. Products of the reaction were recovered by water scrubbing. Analysis of the products of this reaction showed that 15 percent of the methacrolein in the feed had been converted to other products and that the yield of methacrylic acid was 44 percent.

Example V

Still another phosphomolybdic catalyst was prepared according to the following procedure:

9.8 g. of 85 percent phosphoric acid was dissolved in 1500 milliliters of distilled water. 144 g. of molybdenum trioxide was slurried into the phosphoric acid solution. The slurry was heated without boiling for 3 hours and then filtered. The filtrate was evaporated to a volume of 200 milliliters and mixed with 167 g. of a low alkali aqueous silica sol containing 30 percent by weight silica. The resulting mixture was evaporated to dryness and then heated in the presence of air in a muffle furnace for 12 hours at 1000° F. The catalyst was ground and screened to 40-100 mesh.

500 g. of this catalyst were placed in the reactor of Example I. A gaseous stream was introduced to the reactor at atmospheric pressure and a temperature of 730° F. The feed had the following composition:

| Component: | Parts by volume |
| --- | --- |
| Acrolein | 10 |
| Air | 30 |
| Water | 70 |

The contact time was 4.5 seconds and the run was continued for 2400 seconds. The products of this reaction were recovered by water scrubbing the reactor effluent and analyzed. The analysis revealed that 39.1 percent of the acrolein was converted to acrylic acid and 9.9 percent to other useful products (acetic acid and acetaldehyde). The yield of acrylic acid was 78.3 percent.

It is apparent from the preceding disclosure that we have invented an advantageous process for the manufacture of unsaturated carboxylic acids and we desire the application for Letters Patent to cover all modifications of the invention which reasonably fall within the scope of the appended claims.

We claim:

1. A process for the manufacture of an unsaturated carboxylic acid which comprises the step of reacting in the vapor phase at a temperature in the range of 500 to 900° F. an unsaturated aldehyde with oxygen in the presence of a catalyst comprising a phosphomolybdic compound selected from the group consisting of phosphomolybdic acid, bismuth phosphomolybdate, tin phosphomolybdate, and antimony phosphomolybdate.

2. The process of claim 1 in which the catalyst comprises phosphomolybdic acid.

3. The process of claim 1 in which the catalyst comprises bismuth phosphomolybdate.

4. The process of claim 1 in which the catalyst comprises tin phosphomolybdate.

5. The process of claim 1 in which said unsaturated aldehyde is acrolein.

6. The process of claim 1 in which said unsaturated aldehyde is methacrolein.

7. A process for the manufacture of an unsaturated carboxylic acid which comprises the step of reacting in the vapor phase at a temperature in the range of 500 to 900° F. an unsaturated aldehyde with oxygen in the presence of water and a catalyst comprising a phosphomolybdic compound selected from the group consisting of phosphomolybdic acid, bismuth phosphomolybdate, tin phosphomolybdate, and antimony phosphomolybdate.

8. A process for the manufacture of an unsaturated carboxylic acid which comprises the step of contacting in the vapor phase at a temperature in the range of 500 to 900° F. a mixture of an unsaturated aldehyde and an oxygen-containing gas with a catalyst comprising a phosphomolybidic compound selected from the group consisting of phosphomolybdic acid, bismuth phosphomolybdate, tin phosphomolybdate, and antimony phosphomolybdate.

9. The process of claim 8 in which said oxygen-containing gas is air.

10. A process for the manufacture of an unsaturated carboxylic acid which comprises the step of contacting in the vapor phase at a temperature in the range of 500 to 900° F. a mixture of an unsaturated aldehyde and an oxygen-containing gas with a catalyst comprising a phosphomolybidic compound selected from the group consisting of phosphomolybdic acid, bismuth phosphomolybdate, tin phosphomolybdate, and antimony phosphomolybdate in the presence of water.

11. The process of claim 1 in which the reaction is conducted in a fixed bed reactor containing a bed of pelleted catalyst.

12. The process of claim 1 in which the reaction is conducted in a fluidized bed reactor containing a bed of fluidized catalyst.

References Cited in the file of this patent

UNITED STATES PATENTS

| 1,882,712 | Andrussow et al. | Oct. 18, 1932 |
| 2,487,188 | Seymour et al. | Nov. 9, 1949 |
| 2,577,829 | Visor | Dec. 11, 1951 |
| 2,744,929 | Smith et al. | May 8, 1956 |
| 2,772,244 | Shalit et al. | Nov. 27, 1956 |
| 2,773,838 | Reid et al. | Dec. 11, 1956 |

FOREIGN PATENTS

| 560,166 | Great Britain | Mar. 23, 1944 |
| 677,624 | Great Britain | Aug. 20, 1952 |